(12) United States Patent
Nabata et al.

(10) Patent No.: US 9,131,299 B2
(45) Date of Patent: *Sep. 8, 2015

(54) ELECTRONIC DEVICE

(71) Applicant: KYOCERA CORPORATION, Kyoto-shi Kyoto (JP)

(72) Inventors: Toshihisa Nabata, Sagamihara (JP); Satoshi Mizuta, Sagamihara (JP); Tomoaki Miyano, Kameyama (JP); Kiyokazu Sato, Yokohama (JP); Akio Kihara, Kawasaki (JP); Shun Kazama, Yokohama (JP); Masanori Umehara, Yokohama (JP); Motonori Imamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,357

(22) PCT Filed: Apr. 24, 2013

(86) PCT No.: PCT/JP2013/002789
§ 371 (c)(1),
(2) Date: Aug. 29, 2013

(87) PCT Pub. No.: WO2013/164906
PCT Pub. Date: Nov. 7, 2013

(65) Prior Publication Data
US 2015/0036843 A1 Feb. 5, 2015

(30) Foreign Application Priority Data
May 1, 2012 (JP) .................................. 2012-104856

(51) Int. Cl.
*H04R 1/02* (2006.01)
*H04R 17/00* (2006.01)
(Continued)

(52) U.S. Cl.
CPC ................. *H04R 1/02* (2013.01); *H04B 1/3888* (2013.01); *H04M 1/185* (2013.01); *H04R 1/023* (2013.01);
(Continued)

(58) Field of Classification Search
CPC .... H04R 2499/15; H04R 7/045; H04R 17/00; H04R 2440/05; H04R 2499/11
USPC ........................................................ 381/151
See application file for complete search history.

(56) References Cited

U.S. PATENT DOCUMENTS 3,728,741 A   4/1973   Lepor
6,259,188 B1  7/2001   Woodard et al.
(Continued)

FOREIGN PATENT DOCUMENTS

EP   1542064 A1   6/2005
JP   S62-86799 U  6/1987
(Continued)

OTHER PUBLICATIONS
Japanese Office Action; JP2012-0148834; Aug. 28, 2012.
(Continued)

*Primary Examiner* — Duc Nguyen
*Assistant Examiner* — George Monikang
(74) *Attorney, Agent, or Firm* — Studebaker & Brackett PC

(57) ABSTRACT

Provided is an electronic device 1, including: a piezoelectric element 30; a panel 10 configured to support the piezoelectric element 30; and a housing 60 configured to hold the panel 10 and conduct a vibration through the panel 10, the panel 10 generating air-conduction sound and vibration sound that is transmitted by vibrating a part of a human body. The housing 60 includes a first housing portion 62 and a second housing portion 61 located inward of the first housing portion 62, and rigidity-reinforcing portions (63, 150; 64, 160; 65, 66, 170) are disposed between the first housing portion 62 and the second housing portion 61 for improving rigidity of the housing 60.

30 Claims, 6 Drawing Sheets

(51) Int. Cl.
*H04M 1/18* (2006.01)
*H04B 1/3888* (2015.01)
*H04R 7/04* (2006.01)
*H04M 1/02* (2006.01)

(52) U.S. Cl.
CPC ............... *H04R 1/028* (2013.01); *H04R 7/045* (2013.01); *H04R 17/00* (2013.01); *H04M 1/0214* (2013.01); *H04R 2400/03* (2013.01); *H04R 2440/05* (2013.01); *H04R 2460/13* (2013.01); *H04R 2499/11* (2013.01); *H04R 2499/15* (2013.01)

(56) References Cited

U.S. PATENT DOCUMENTS

| | | | |
|---|---|---|---|
| 6,427,017 | B1 | 7/2002 | Toki |
| 7,050,600 | B2 | 5/2006 | Saiki et al. |
| 7,174,025 | B2 | 2/2007 | Azima et al. |
| 7,421,088 | B2 | 9/2008 | Cranfill et al. |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 | 10/2012 | Idzik et al. |
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1 | 6/2002 | Bank et al. |
| 2002/0076061 | A1 | 6/2002 | Ashtiani et al. |
| 2004/0109571 | A1 | 6/2004 | Yoshimine |
| 2005/0002537 | A1 | 1/2005 | Azima et al. |
| 2005/0057527 | A1 | 3/2005 | Takenaka et al. |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1 | 6/2006 | Kobayashi |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1 | 5/2007 | Takashima et al. |
| 2008/0268921 | A1 | 10/2008 | Taniguchi et al. |
| 2009/0103767 | A1 | 4/2009 | Kuroda et al. |
| 2009/0147969 | A1 | 6/2009 | Kinouchi et al. |
| 2009/0290746 | A1 | 11/2009 | Miyata |
| 2009/0296976 | A1 | 12/2009 | Tsai et al. |
| 2010/0225600 | A1 | 9/2010 | Dai et al. |
| 2010/0278362 | A1 | 11/2010 | Kim |
| 2011/0234459 | A1 | 9/2011 | Yabe |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |

FOREIGN PATENT DOCUMENTS

| | | |
|---|---|---|
| JP | 07-296786 A | 11/1995 |
| JP | 08-223675 A | 8/1996 |
| JP | H09-247795 A | 9/1997 |
| JP | H11-25940 A | 1/1999 |
| JP | 2001-007546 A | 1/2001 |
| JP | 2002-027065 A | 1/2002 |
| JP | 2002-185593 A | 6/2002 |
| JP | 2002-219413 A | 8/2002 |
| JP | 2002-232542 A | 8/2002 |
| JP | 2002-305569 A | 10/2002 |
| JP | 2004-187031 A | 7/2004 |
| JP | 2005-214793 A | 8/2005 |
| JP | 2005-236352 A | 9/2005 |
| JP | 2005-284054 A | 10/2005 |
| JP | 2005-348193 A | 12/2005 |
| JP | 2007-502594 A | 2/2007 |
| JP | 2007-082009 A | 3/2007 |
| JP | 2007-180827 A | 7/2007 |
| JP | 2007-189578 A | 7/2007 |
| JP | 2008-017398 A | 1/2008 |
| JP | 2008-270879 A | 11/2008 |
| JP | 2009-118396 A | 5/2009 |
| JP | 2011-091719 A | 5/2011 |
| JP | 2012-148844 A | 7/2012 |
| JP | 2012-148834 A | 8/2012 |
| JP | 2013-110535 A | 6/2013 |
| JP | 5255142 B1 | 8/2013 |
| JP | 2013-207795 A | 10/2013 |
| JP | 2013-207796 A | 10/2013 |
| JP | 2013-223238 A | 10/2013 |
| JP | 2013-232874 A | 11/2013 |
| JP | 2013-255212 A | 12/2013 |
| KR | 10-1068254 B1 | 9/2011 |
| WO | 2004/023199 A1 | 3/2004 |
| WO | 2004/051967 A1 | 6/2004 |
| WO | 2006/059679 A1 | 6/2006 |
| WO | 2006/114985 A1 | 11/2006 |
| WO | 2012/025783 A1 | 3/2012 |

OTHER PUBLICATIONS

Japanese Office Action; JP2012-0148834; Feb. 5, 2013.
Japanese Office Action; JP2012-0148834; Apr. 23, 2013.
An Office Action; "Notice of Reasons for Rejection," issued by the Japanese Patent Office on Aug. 26, 2014, which corresponds to Japanese Patent Application No. 2014-016081 and is related to U.S. Appl. No. 14/002,357; with English language concise explanation.
An Office Action; "Notice of Reasons for Rejection," issued by the Japanese Patent Office on Dec. 2, 2014, which corresponds to Japanese Patent Application No. 2014-016082 and is related to U.S. Appl. Nos. 14/002,675 and 14/002,357; with English language concise explanation.
An Office Action; "Notice of Reasons for Rejection," issued by the Japanese Patent Office on Dec. 2, 2014, which corresponds to Japanese Patent Application No. 2014-016046 and is related to U.S. Appl. Nos. 14/002,698 and 14/002,357; with English language concise explanation.
International Search Report; PCT/JP2013/002789; Jun. 11, 2013.
An Office Action issued by the Japanese Patent Office on Aug. 26, 2014, which corresponds to Japanese Patent Application No. 2014-016048 and is related to U.S. Appl. Nos. 14/002,668 and 14/002,357.
An Office Action issued by the Japanese Patent Office on Jul. 31, 2012, which corresponds to Japanese Patent Application No. 2012-148844 and is related to U.S. Appl. Nos. 14/002,668 and 14/002,357.
An Office Action issued by the Japanese Patent Office on Jan. 8, 2013, which corresponds to Japanese Patent Application No. 2012-148844 and is related to U.S. Appl. Nos. 14/002,668 and 14/002,357.
An Office Action issued by the Japanese Patent Office on Jul. 31, 2012, which corresponds to Japanese Patent Application No. 2012-148798 and is related to U.S. Appl. Nos. 14/002,675 and 14/002,357.
An Office Action issued by the Japanese Patent Office on Jan. 8, 2013, which corresponds to Japanese Patent Application No. 2012-148798 and is related to U.S. Appl. Nos. 14/002,675 and 14/002,357.
An Office Action issued by the Japanese Patent Office on Apr. 23, 2013, which corresponds to Japanese Patent Application No. 2012-148798 and is related to U.S. Appl. Nos. 14/002,675 and 14/002,357.
An Office Action issued by the Japanese Patent Office on Jul. 31, 2012, which corresponds to Japanese Patent Application No. 2012-148773 and is related to U.S. Appl. Nos. 14/002,699 and 14/002,357.
An Office Action issued by the Japanese Patent Office on Jan. 8, 2013, which corresponds to Japanese Patent Application No. 2012-148773 and is related to U.S. Appl. Nos. 14/002,699 and 14/002,357.
An Office Action issued by the Japanese Patent Office on Jul. 31, 2012, which corresponds to Japanese Patent Application No. 2012-148809 and is related to U.S. Appl. Nos. 14/002,698 and 14/002,357.
An Office Action issued by the Japanese Patent Office on Jan. 8, 2013, which corresponds to Japanese Patent Application No. 2012-148809 and is related to U.S. Appl. Nos. 14/002,698 and 14/002,357.
International Search Report; PCT/JP2013/002088; issued on May 14, 2013, which corresponds to U.S. Appl. Nos. 14/002,668 and 14/002,357.
International Search Report; PCT/JP2013/002530; issued on May 14, 2013, which corresponds to U.S. Appl. Nos. 14/002,675 and 14/002,357.

(56) References Cited

OTHER PUBLICATIONS

International Search Report; PCT/JP2013/002874; issued on Jun. 11, 2013, which corresponds to U.S. Appl. Nos. 14/002,699 and 14/002,357.

International Search Report; PCT/JP2013/002138; issued on May 14, 2013, which corresponds to U.S. Appl. Nos. 14/002,698 and 14/002,357.

The extended European search report issued by the European Patent Office on Jun. 11, 2013, which corresponds to European Patent Application No. 13163442.0 and is related to U.S. Appl. Nos. 13/862,333 and 14/002,357.

An Office Action; "Notice of Reasons for Rejection," issued by the Japanese Patent Office on Feb. 10, 2015, which corresponds to Japanese Patent Application No. 2012-089203 and is related to U.S. Appl. Nos. 13/860,150 and 14/002,357; with English language concise explanation.

An Office Action; "Notice of Reasons for Rejection," issued by the Japanese Patent Office on Mar. 17, 2015, which corresponds to Japanese Patent Application No. 2014-016048 and is related to U.S. Appl. No. 14/002,668 and U.S Appl. No. 14/002,357; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. No. 13/862,333 and U.S. Appl. No. 14/002,357; with English language concise explanation.

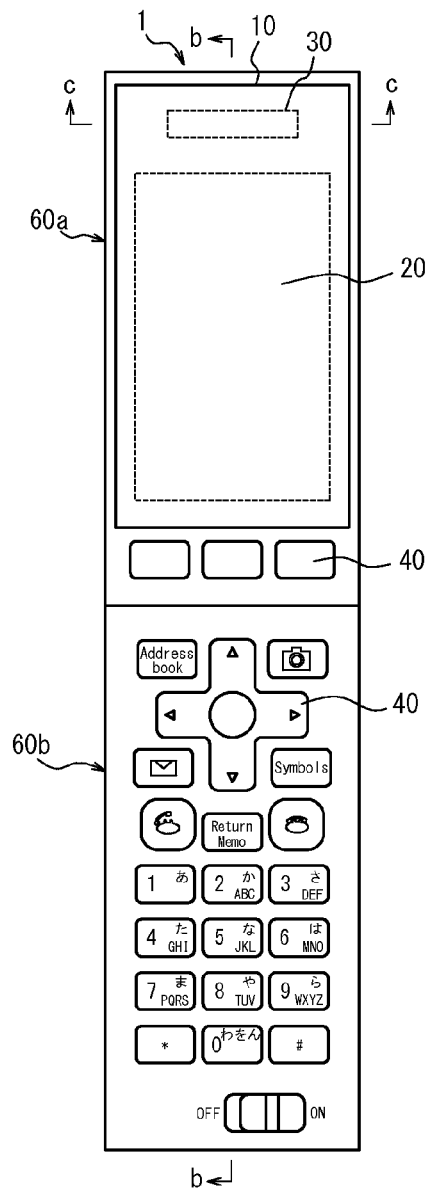
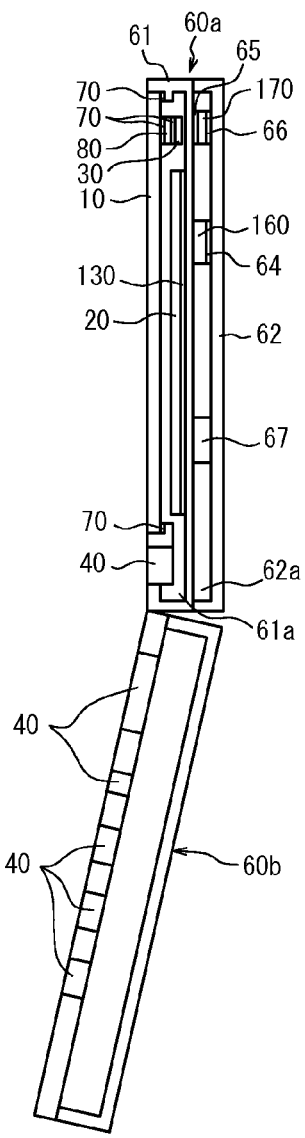
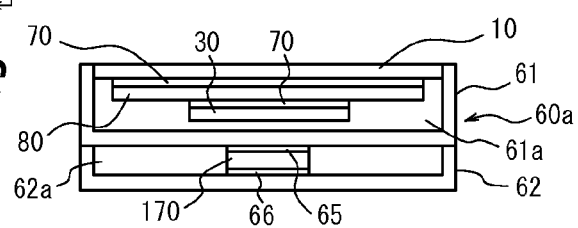

ELECTRONIC DEVICE

CROSS-REFERENCE TO RELATED APPLICATION

This application claims priority to and the benefit of Japanese Patent Application No. 2012-104856 filed on May 1, 2012, the entire contents of which are incorporated herein by reference.

FIELD

The present invention relates to an electronic device that vibrates a panel by applying a predetermined electric signal (sound signal) to a piezoelectric element and that transfers the vibration of the panel to a human body to thereby transmit air conduction sound and vibration sound to a user.

BACKGROUND

Patent Literature 1 describes an electronic device such as a mobile phone that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that bone conduction sound is transmitted to the auditory nerve of the user through a part of a user's body (e.g. a cartilaginous portion of an external ear) that is in contact with the vibrating object.

According to Patent Literature 1, in the described mobile phone, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexture vibration. As a result, when the user places the vibration body in contact with an auricle, air conduction sound and bone conduction sound are transmitted to the user.

CITATION LIST

Patent Literature 1: Japanese Patent Application Publication No. 2005-348193

SUMMARY

In the electronic device described in Patent Literature 1, there are no measures taken to prevent sound leakage to an external environment that occurs due to a vibration of the housing resulting from a vibration of the vibration body transmitted to the housing.

The present invention is to solve the above problem and to provide an electronic device that is capable of reducing sound leakage due to the vibration of the housing.

One aspect of the present invention provides an electronic device, including: a piezoelectric element; a panel configured to support the piezoelectric element; and a housing configured to hold the panel and conduct a vibration through the panel, such that the panel generates air-conduction sound and vibration sound that is transmitted by vibrating a part of a human body. The housing includes a first housing portion and a second housing portion located inward of the first housing portion, and a rigidity-reinforcing portion is disposed between the first housing portion and the second housing portion for improving rigidity of the housing.

The rigidity-reinforcing portion may apply pressing force to the first housing portion and the second housing portion.

The rigidity-reinforcing portion may be configured using an electronic component and an elastic body.

The electronic component may include a battery.

The elastic body may serve as a wave absorber sheet that covers the battery.

A sealing member attached to a surface of the battery may serve as the elastic body.

The electronic component may include a speaker.

The elastic body may serve as a waterproof sheet that covers the speaker

The electronic device may include a camera module.

The first housing portion may include a first recessed portion, and the second housing portion and the rigidity-reinforcing portion may be disposed in the first recessed portion.

The second housing portion may include a second recessed portion, and the rigidity-reinforcing portion may be disposed between a bottom portion of the first recessed portion and a bottom portion of the second recessed portion.

The panel may be vibrated in the second recessed portion and in a range that remains out of contact with the bottom portion of the second recessed portion during the vibration.

The piezoelectric element may be disposed on one end side of the housing in one direction thereof.

The housing may have a rectangular shape in a planar view, a length of each of the two opposing sides of the rectangular shape being greater than a length from an antitragus to an inferior crus of antihelix.

The housing may have other two opposing sides, a length of each of the other two opposing sides being greater than a length from a tragus to an antihelix.

The piezoelectric element may be fixed such that the piezoelectric element is joined to the housing by a joining member.

The joining member may include an adhesive agent that is not thermosetting.

The joining member may include a double-sided adhesive tape.

The panel may be joined to the housing by a joining member.

The joining member that joins the panel to the housing may include an adhesive agent that is not thermosetting.

The joining member that joins the panel to the housing may include a double-sided adhesive tape.

The panel may form a part or an entirety of any of a display unit, an input unit, and a cover of the display unit.

A portion of the panel where the piezoelectric element is fixed may be located outside of a portion of the panel that overlaps with the display unit in a planar view.

The display unit may be fixed to the panel from an inside of the housing.

According to the electronic device of the present invention, sound leakage due to the vibration of the housing is reduced.

BRIEF DESCRIPTION OF DRAWINGS

The present invention will be further described below with reference to the accompanying drawings, wherein

FIGS. 5A-5C schematically illustrate a part of a housing structure of an electronic device according to a second embodiment.

DESCRIPTION OF EMBODIMENTS

Figure 1:
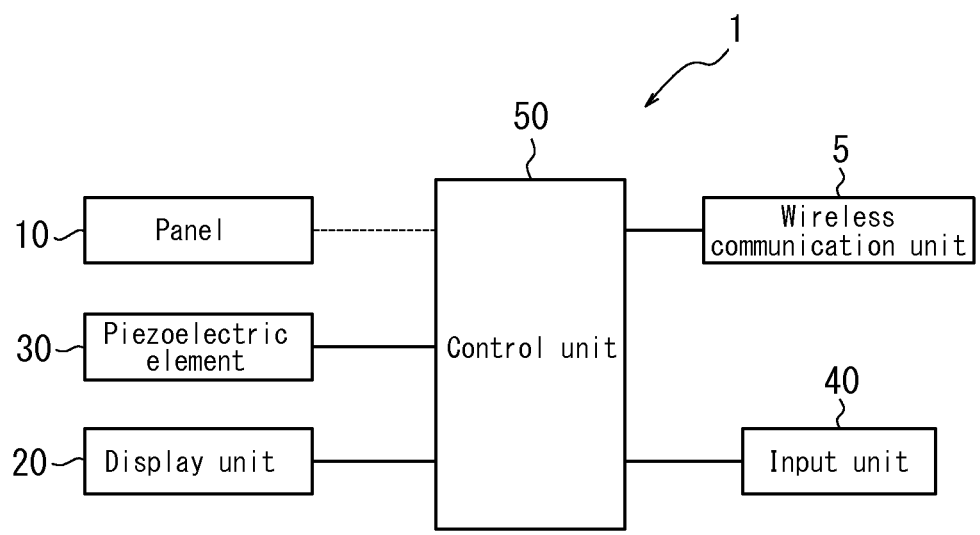
FIG. 1 is a function block diagram of a part of an electronic device according to one embodiment of the present invention.

Embodiments of the present invention will be described with reference to the accompanying drawings. FIG. 1 is a function block diagram of a part of an electronic device 1 according to one embodiment of the present invention. The electronic device 1, which is a mobile phone, for example, includes a wireless communication unit 5, a panel 10, a display unit 20, a piezoelectric element 30, an input unit 40, and a control unit 50. The wireless communication unit 5 has a general configuration and is wirelessly connected to a communication network via a base station.

The panel 10 may be a touch panel that is configured to detect a contact or a cover panel that protects the display unit 20. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of a user, a pen, a stylus pen, or the like. The touch panel may detect a contact using any type, such as the capacitive type, the resistive film type, a surface acoustic wave type (or an ultrasonic type), an infrared type, an electromagnetic induction type, a load detection type, and the like.

The display unit 20 is a display device such as a liquid crystal display, an organic EL display, and an inorganic EL display. The display unit 20 is disposed at a back of the panel 10. For example, the display unit 20 may be disposed on a back surface of the panel 10 using a joining member (e.g. an adhesive agent). As another example, the display unit 20 may be supported by the housing of the electronic device 1 such that the display unit 20 is spaced apart from the panel 10.

The piezoelectric element 30 is an element that is configured to undergo expansion and contraction or flexure (bending) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated-type piezoelectric element. The laminated-type piezoelectric element includes a laminated-type unimorph element in which (e.g. 16 or 24 layers of) unimorph are laminated or a laminated-type bimorph element in which (e.g. 16 or 24 layers of) bimorph are laminated. The laminated-type piezoelectric element is configured by a laminated structure of a plurality of dielectric layers made of PZT (lead zirconate titanate) and electrode layers each disposed between adjacent ones of the dielectric layers, for example. Unimorph undergoes expansion and contraction in response to an electric signal (voltage) applied thereto, and bimorph undergoes flexure in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element 30 may be attached to the panel 10 via an intermediate member (e.g. a metal plate). The piezoelectric element 30 is disposed on the back surface of the panel 10 such that the piezoelectric element 30 is at a predetermined distance from the surface of the inner side of the housing. Preferably, the piezoelectric element 30 remains at a predetermined distance from the surface of the inner side of the housing even in a state where the piezoelectric element 30 undergoes expansion and contraction or flexure. That is to say, the distance between the piezoelectric element 30 and the surface of the inner side of the housing is preferably greater than a maximum amount of deformation of the piezoelectric element 30.

The input unit 40 is configured to receive an operation input from the user and is configured by an operation button (an operation key), for example. When the panel 10 is the touch panel, the panel 10 is also capable of receiving an operation input from the user by detecting a contact made by the user.

The control unit 50 is a processor configured to control the electronic device 1. The control unit 50 applies, to the piezoelectric element 30, a predetermined electric signal (voltage corresponding to a sound signal representing voice of a party on the phone, music including a phone melody or a tune, or the like). The sound signal may be based on music data stored in an internal memory or may be reproduced according to music data stored in an external server and the like via the network.

When applied with an electric signal, the piezoelectric element 30 undergoes expansion and contraction or flexure in a longitudinal direction thereof. In this regard, the panel 10 attached with the piezoelectric element 30 is deformed in conjunction with expansion and contraction or flexure of the piezoelectric element 30, thus resulting in a flexure vibration of the panel 10. Here, a maximum voltage of the electric signal that the control unit 50 applies to the piezoelectric element 30 may be ±15 V which is greater than ±5 V, that is, an application voltage of a so-called panel speaker for a purpose of sound conduction using not vibration sound but air conduction sound. With the above configuration, even when the user forcefully presses the panel 10 against a user's body with force greater than or equal to 3 N (force ranging from 5 N to 10 N), the flexure vibration of the panel 10 occurs. As a result, vibration sound which is transmitted through a part of the user's body (e.g. a cartilaginous portion of an external ear) is generated. Note that an amount of the application voltage is appropriately adjustable according to how tightly the panel 10 is fixed to the housing or a support member or according to a capability of the piezoelectric element 30.

When the control unit 50 applies an electric signal to the piezoelectric element 30, the piezoelectric element 30 undergoes expansion and contraction or flexure in the longitudinal direction. In this regard, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" refers to a state in which the panel is bent directly by expansion and contraction or bending (flexure) of the piezoelectric element via the joining member or via the joining member and a reinforcing member 80 which is later described.

Thus, the panel 10 generates air-conduction sound, and the panel 10 also generates human body vibration sound that is transmitted through a part of the body when the user places the part of the body (e.g. the cartilaginous portion of the external ear) in contact with the panel 10. For example, the control unit 50 may apply an electric signal corresponding to a sound signal representing voice of the party on the phone or the like, so as to generate air-conduction sound and human body vibration sound that correspond to the sound signal.

The flexture vibration is caused in an area of the panel 10 where the piezoelectric element 30 is disposed and in areas of the panel 10 that are away from the disposed area. The panel 10 includes, in the areas vibrated, a plurality of portions that is configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly or in a cyclic manner across the panel 10 at a certain moment. In other words, the vibration of a plurality of wavelengths is detected across all areas of the panel 10. In order to prevent the aforementioned vibration of the panel 10 from being attenuated even when the user forcefully presses the panel 10 against the user's body with force ranging from 5 N to 10 N, for example, the maximum voltage that the control unit 50 applies to the piezoelectric element 30 may be ±15 V. The above configuration allows the user to listen to sound while placing the ear in contact with the areas of the panel 10 (e.g. a middle portion of the panel 10) that are away from the area where the piezoelectric element 30 is disposed.

Figure 2:
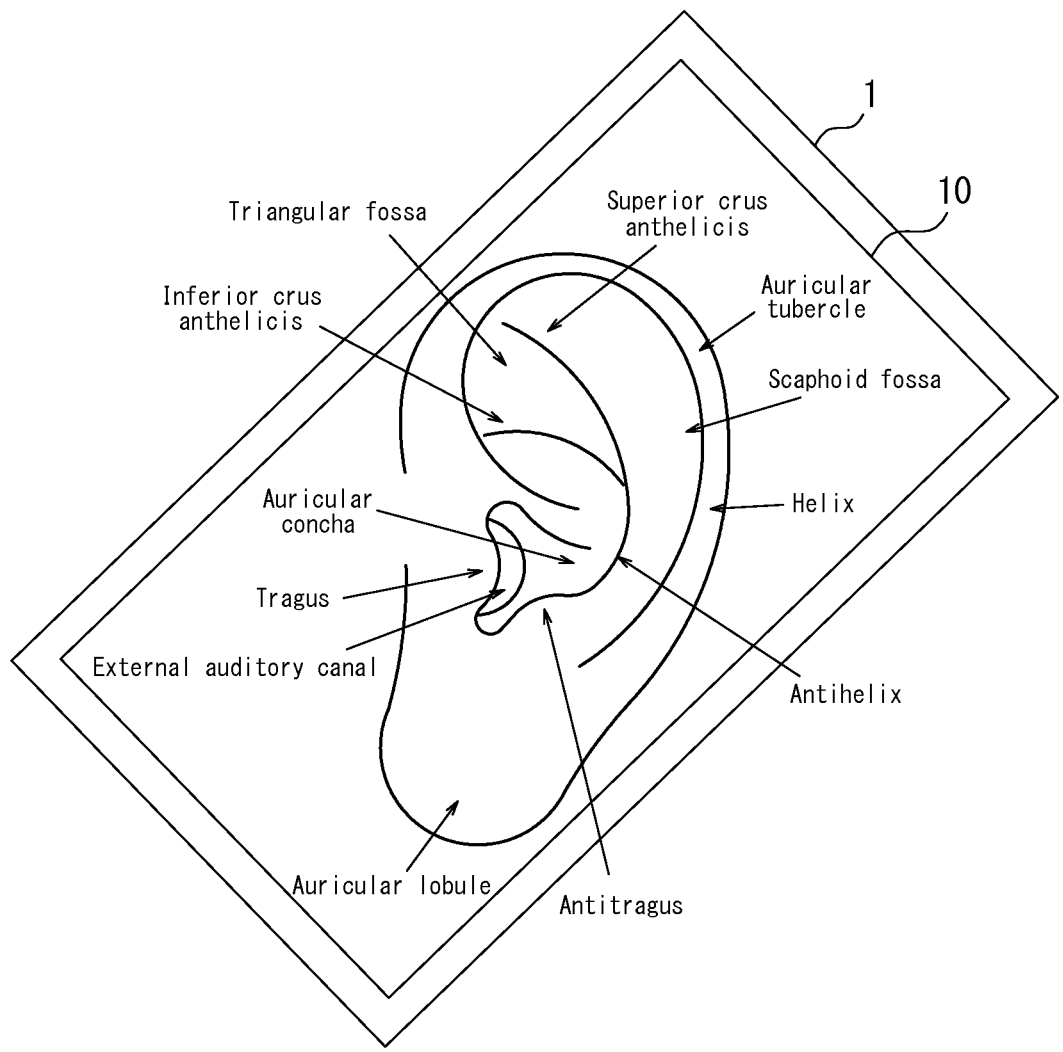
FIG. 2 illustrates a preferable shape of a panel.

It is to be noted that the panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through an external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. The areas having the above lengths and widths may have a rectangular shape or an elliptical shape with as a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than the average ear size of the Japanese would be generally capable of covering a whole ear of a foreigner as well. With the aforementioned dimension and shape, the panel 10 is capable of covering the user's ear, which offers tolerance to misalignment when the user presses the panel 10 to the ear.

The above electronic device 1 is capable of transmitting, to the user, air-conduction sound and vibration sound which is transmitted through a part of the user's body (e.g. the cartilaginous portion of the external ear). Accordingly, when the panel 10 outputs sound at substantially the same volume level as a dynamic receiver, less amount of sound propagates to an external environment of the electronic device 1 due to the vibration of air resulting from the vibration of the panel 10, compared to a case of the dynamic receiver. Accordingly, the electronic device 1 is well-suited for a situation where a recorded message is listened to on the train and the like, for example.

Furthermore, since the above electronic device 1 transmits sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, the waterproof structure of the electronic device is simplified. When the electronic device 1 is provided with a dynamic receiver, the sound discharge opening may be closed by a member that passes air through and blocks liquid. The member that passes air through and blocks liquid may be Gore-Tex™.

First Embodiment

Figure 3A:
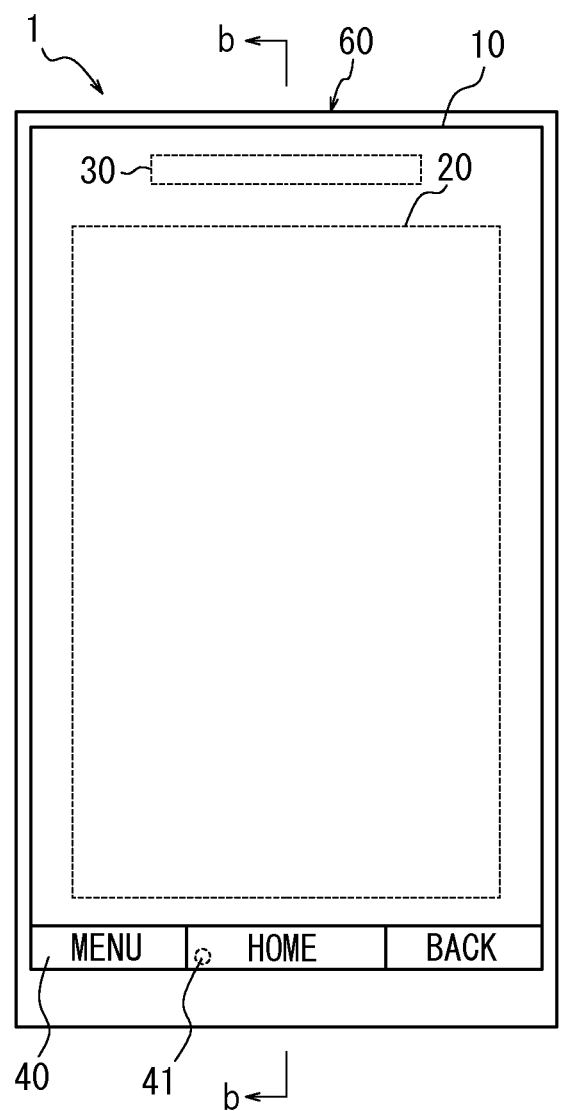
FIGS. 3A and 3B schematically illustrate a part of a housing structure of an electronic device according to a first embodiment.
Figure 3B:
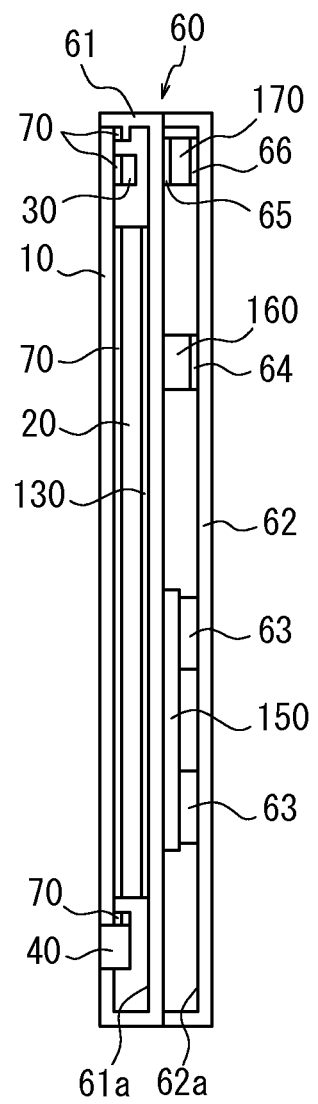

FIGS. 3A and 3B schematically illustrate a part of a housing structure of the electronic device 1 according to a first embodiment. FIG. 3A is a front view, and FIG. 3B is a sectional view taken along a line b-b of FIG. 3A. The electronic device 1 illustrated in FIG. 3 is a smartphone in which a rectangular glass plate is disposed as the panel 10 on a front surface of a housing 60 (e.g. a metal or a resin casing).

The panel 10 forms the touch panel of the capacitive type, for example, and the panel 10 is supported by the housing 60 via a joining member 70. The display unit 20 is joined to the back surface of the panel 10 except for one end side (an upper portion) of the panel 10 in the longitudinal direction thereof via the joining member 70. The display unit 20 is connected to a circuit substrate 130. The piezoelectric element 30 is joined to the upper portion of the back surface of the panel 10 that is located on the one end side in one direction of the panel 10 via the joining member 70. The piezoelectric element 30 has a rectangular shape and is joined to the panel 10 such that the major axis of the rectangular shape extends along a short side of the panel 10. Note that the joining member 70 may be the adhesive agent, the double-sided adhesive tape, or the like having thermosetting properties, ultraviolet-curable properties, and the like. For example, the joining member 70 may be an optical elastic resin, which is a colorless and transparent ultraviolet-curable acrylic adhesive agent.

The input unit 40 is supported by the housing 60 on another side (i.e. a lower portion) of the panel 10 in the longitudinal direction thereof. As indicated by a broken line, the input unit 40 is provided with a microphone mouthpiece 41. That is to say, the piezoelectric element 30 is disposed near the upper portion of the rectangular-shaped housing 60, and the mouthpiece 41 is formed near the lower portion.

The housing 60 includes a rear case (i.e. a second housing portion) 61 and a cover member (i.e. a first housing portion) 62 detachably mounted to the rear case 61. The rear case 61 is configured to include a recessed portion (i.e. a second recessed portion) 61a. Similarly, the cover member 62 is configured to include a recessed portion (i.e. a first recessed portion) 62a. The recessed portion 62a of the cover member 62 is provided with the rear case 61. The recessed portion 61a of the rear case 61 is provided with the display unit 20, the piezoelectric element 30, the input unit 40, and the circuit substrate 130. The panel 10 is attached to the housing 60 such that the panel 10 is vibrated in the recessed portion 61a and in a range that remains out of contact with a bottom portion of the recessed portion 61a during the vibration.

Between the bottom portion of the recessed portion 61a of the rear case 61 and a bottom portion of the recessed portion 62a of the cover member 62, various electronic components are disposed. FIG. 3B illustrates an example where there are disposed, as the electronic components, a battery 150 that operates the electronic device 1, a dynamic speaker 160 configured to be operated simultaneously or selectively with the piezoelectric element 30 so as to output audible sound, and a camera module 170 configured to image a subject.

In the first embodiment, an elastic body 63 is disposed between the battery 150 and the cover member 62. Furthermore, an elastic body 64 is disposed between the dynamic speaker 160 and the cover member 62. Moreover, an elastic body 65 is disposed between the camera module 170 and the rear case 61, and an elastic body 66 is disposed between the camera module 170 and the cover member 62 such that the elastic body 66 does not affect an imaging optical path.

It should be noted that the elastic body 63 and the battery 150 together form a rigidity-reinforcing portion that applies pressing force to the rear case 61 and the cover member 62. The elastic body 64 and the dynamic speaker 160 together form a rigidity-reinforcing portion that applies pressing force to the rear case 61 and the cover member 62. Similarly, the elastic bodies 65 and 66 and the camera module 170 together form a rigidity-reinforcing portion that applies pressing force to the rear case 61 and the cover member 62. The elastic bodies 63, 64, 65, and 66 may be configured by an organic material (e.g. urethane resin, rubber, melamine resin, and a sponge) or metal (e.g. a metal spring), for example. It should be noted that an electromagnetic wave absorber sheet configured to prevent radiation of an unnecessary electromagnetic wave, or a sealing member configured to be attached to the battery 150 may serve as the elastic body 63. The elastic bodies 64, 65, and 66 each may double as a waterproof sheet or a dustproof sheet.

Figure 4:
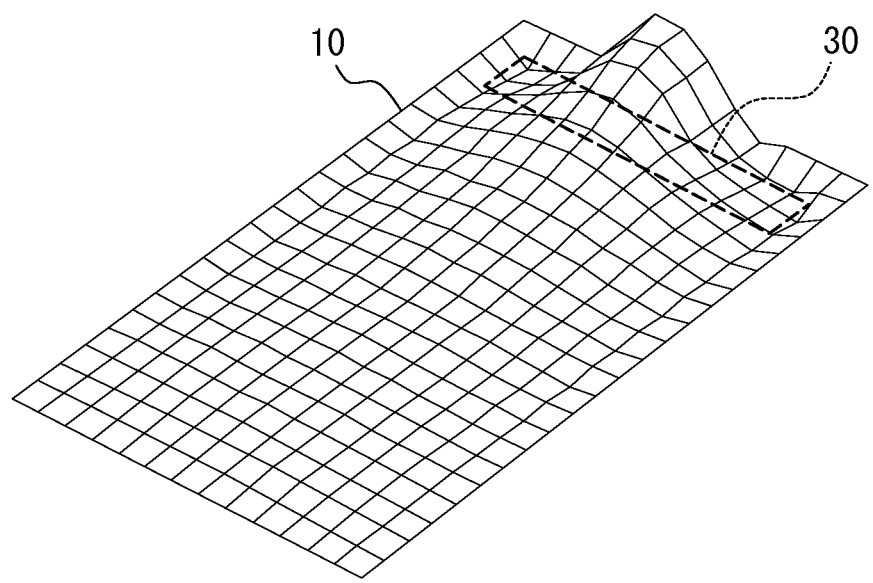
FIG. 4 illustrates one example of a vibration of a panel of the electronic device according to the first embodiment.

FIG. 4 illustrates one example of the vibration of the panel 10 of the electronic device 1 according to the first embodiment. In the electronic device 1 according to the first embodiment, the display unit 20 is attached to the panel 10. Accordingly, the lower portion of the panel 10 is less likely to vibrate compared to the upper portion of the panel 10 attached with the piezoelectric element 30. As a result, in the lower portion of the panel 10, sound leakage due to the vibration occurring in the lower portion of the panel 10 is reduced. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long side direction of the piezoelectric element 30.

Thus, according to the electronic device 1 of the present embodiment, the panel 10 is deformed due to deformation of the piezoelectric element 30 attached to the back surface of the panel 10. The vibration is achieved sufficiently in areas from the one end side of the panel 10 in the longitudinal direction thereof, where the piezoelectric element 30 is adhered, to around the middle portion of the panel 10. Accordingly, the user is able to hear air-conduction sound and vibration sound generated by the vibration of the panel 10 by placing a part of the user's body (e.g. the cartilaginous portion of the external ear) in contact with at least a portion of the areas from the middle portion to the upper portion of the panel 10. As a result, air conduction sound and vibration sound are transmitted to the user without having to protrude the vibration body from an outer surface of the housing 60. Accordingly, usability of the electronic device is improved compared to the electronic device described in Patent Literature 1 by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, although in a case where not the panel 10 but the housing 60 is deformed the user tends to drop a terminal device while the vibration is generated, such dropping is less likely to occur in the case where the panel 10 is vibrated.

Meanwhile, in the present embodiment, the display unit 20 and the piezoelectric element 30 are joined to the panel 10 by the joining member 70. The above structure allows attachment of the piezoelectric element 30 to the panel 10 while flexibility of deformation of the piezoelectric element 30 is not significantly limited. The joining member 70 may be the adhesive agent that is not thermosetting. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10. Since the panel 10 is also joined to the housing 60 by the joining member 70, a similar effect is achieved. Besides, the vibration is prevented from being directly transmitted from the panel 10 to the cover member 62 of the housing 60, and therefore the risk that the user drops the electronic device 1 is reduced compared to the case where the housing itself undergoes a large vibration.

Meanwhile, the rear case 61 and the cover member 62 are applied with pressing force by the rigidity-reinforcing portion. As a result, a point of contact and support is increased, and therefore rigidity of each of the rear case 61 and the cover member 62 is improved. Accordingly, rigidity of the housing 60 as a whole is improved, and the vibration of the housing 60 is reduced. Therefore, sound leakage is reduced, and the risk that the user drops the electronic device 1 is further reduced. Furthermore, by configuring the rigidity-reinforcing portion using the electronic components contained in the housing 60, such as the battery 150, the dynamic speaker 160, and the camera module 170, a thickness of the rigidity-reinforcing portion is increased by the electronic components. As a result, compared to a case where the rigidity-reinforcing portion is configured simply by the elastic body, the elastic body is reduced in size, and cost is lowered. Moreover, since rigidity of the housing 60 is improved, the panel 10 held by the housing 60 is efficiently vibrated, and a sound voltage level according to the vibration of the panel 10 is increased. Moreover, since rigidity of the rear case 61 and the cover member 62 is improved, the thickness of each of the rear case 61 and the cover member 62 is reduced, and, thereby the thickness of the electronic device as a whole is reduced.

Second Embodiment

FIGS. 5A-5C schematically illustrate the housing structure of the electronic device 1 according to a second embodiment. FIG. 5A is a front view, FIG. 5B is a sectional view taken along a line b-b of FIG. 5A, and FIG. 5C is a sectional view taken along a line c-c of FIG. 5A. The electronic device 1 illustrated in FIG. 5 is a foldable mobile phone in which a cover panel (e.g. an acryl plate), which serves as the panel 10 and configured to cover the display unit 20, is provided on a front surface of an upper-side housing 60a, and the input unit 40 is provided in a lower-side housing 60b.

In the second embodiment, the reinforcing member 80 is disposed between the panel 10 and the piezoelectric element 30. The reinforcing member 80 may be a resin plate, a metal plate, or a resin plate including glass fiber. That is to say, the electronic device 1 according to the second embodiment has a structure where the piezoelectric element 30 and the reinforcing member 80 are adhered by the joining member 70, and the reinforcing member 80 and the panel 10 are adhered by the joining member 70.

Furthermore, in the second embodiment, the display unit 20 is not adhered to the panel 10 but supported by the housing 60a. That is to say, the electronic device 1 according to the second embodiment has a structure where the display unit 20 is spaced apart from the panel 10, and the display unit 20 is coupled to the rear case (i.e. the second housing portion) 61 forming the housing 60a, via the circuit substrate 130.

The display unit 20, the piezoelectric element 30, and the circuit substrate 130 are disposed in the recessed portion 61a of the rear case 61. The panel 10 is attached to the housing 60 such that the panel 10 is vibrated within area range that remains out of contact with the bottom portion of the recessed portion 61a during the vibration. The recessed portion 62a of the cover member (i.e. the first housing portion) 62 is provided with the rear case 61. Between the bottom portion of the recessed portion 61a of the rear case 61 and the bottom portion of the recessed portion 62a of the cover member 62, various electronic components, such as the dynamic speaker 160 and the camera module 170, are provided.

Similarly to the first embodiment, the elastic body 64 is disposed between the dynamic speaker 160 and the cover member 62, and the dynamic speaker 160 and the elastic body 64 together form the rigidity-reinforcing portion that applies pressing force to the rear case 61 and the cover member 62. The elastic body 65 is also disposed between the camera module 170 and the rear case 61, and the elastic body 66 is also disposed between the camera module 170 and the cover member 62. The camera module 170 and the elastic bodies 65 and 66 together form the rigidity-reinforcing portion that applies pressing force to the rear case 61 and the cover member 62. Additionally, an elastic body 67 forming a rigidity-reinforcing portion is disposed in an appropriate position between the rear case 61 and the cover member 62, for applying pressing force to the rear case 61 and the cover member 62. Similarly to the elastic body 64, the elastic body 67 may be configured by the organic material (e.g. urethane resin, rubber, melamine resin, and a sponge) or metal (e.g. the metal spring), for example. The elastic body 67 may have lower elasticity than the elastic bodies that form the rigidity-reinforcing portions together with the electronic components.

Figure 6:
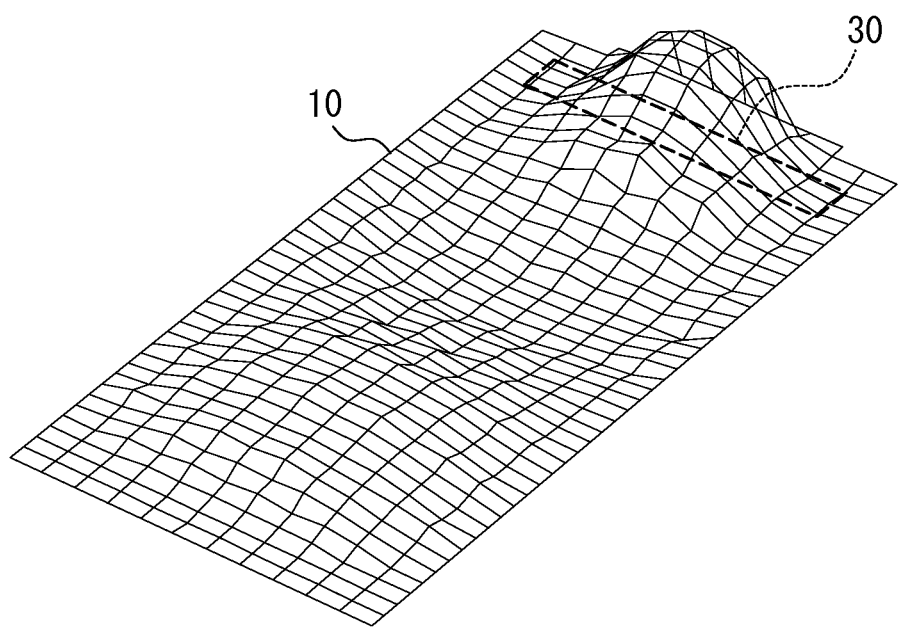
FIG. 6 illustrates one example of a vibration of a panel of the electronic device according to the second embodiment.

FIG. 6 illustrates one example of the vibration of the panel 10 of the electronic device 1 according to the second embodiment. Since in the electronic device 1 according to the second embodiment the panel 10 is the acryl plate with lower rigidity compared to the glass plate, and moreover, the display unit 20 is not adhered to the back surface of the panel 10, amplitude generated by the piezoelectric element 30 is larger than the case of the electronic device 1 according to the first embodiment illustrated in FIG. 4. The vibration is caused in an area of the panel 10 where the piezoelectric element 30 is disposed and in areas of the panel 10 that are away from the disposed area. Accordingly, the user is able to hear air-conduction sound transmitted through air and to hear vibration sound by placing the ear in contact with any position of the panel 10.

As described above, according to the electronic device 1 of the present embodiment, the reinforcing member 80 and the panel 10 are deformed due to deformation of the piezoelectric element 30 attached to the panel 10 via the reinforcing member 80, and air-conduction sound and vibration sound are transmitted to an object that is in contact with the deformed panel 10. Accordingly, air-conduction sound and vibration sound are transmitted to the user without the need for pressing the vibration body itself to the ear. Furthermore, the piezoelectric element 30 is attached to the surface of the inner side of the housing 60a. Accordingly, air-conduction sound and vibration sound are transmitted to the user without having to protrude the vibration body from the outer surface of the housing 60a. Moreover, the deformation is caused in the area of the panel 10 where the piezoelectric element 30 is disposed and in other areas of the panel 10, for transmission of air-conduction sound and vibration sound. Accordingly, the user is able to hear air-conduction sound transmitted through air and to hear vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is decreased, and sound characteristics in a low frequency range are improved. Note that instead of the reinforcing member 80 a plate-shaped weight may be attached to the piezoelectric element 30 by the joining member 70.

Moreover, the rear case 61 and the cover member 62 of the housing 60a, where the panel 10 is disposed, are applied with pressing force by the rigidity-reinforcing portion. As a result, the point of contact and support of each of the rear case 61 and the cover member 62 is increased. As a result, rigidity of the housing 60a is improved and the vibration is reduced, and accordingly, sound leakage is reduced. When the dynamic speaker 160 is used to configure the rigidity-reinforcing portion, the thickness of the rigidity-reinforcing portion is increased. As a result, compared to the case where the rigidity-reinforcing portion is configured simply by the elastic body 67, the elastic body is reduced in size, and cost is lowered. Moreover, since rigidity of the housing 60 is improved, the panel 10 held by the housing 60 is efficiently vibrated, and a sound voltage level according to the vibration of the panel 10 is increased. Moreover, since rigidity of the rear case 61 and the cover member 62 is improved, the thickness of each of the rear case 61 and the cover member 62 is reduced, whereby the thickness of the electronic device as a whole is reduced.

Although the present invention has been described based on the drawings and the embodiments thereof, it should be noted that a person skilled in the art may easily make a variety of modifications and alterations according to the present disclosure. Note that the modifications and alterations are within the scope of the present invention. For example, functions and the like included in the components and steps may be rearranged as long as the functions and the like are logically consistent. A plurality of component parts, the steps, and the like may also be integrated or separated.

Although the rigidity-reinforcing portion may be disposed in the appropriate position between the rear case 61 and the cover member 62, and a number of the rigidity-reinforcing portion may be arbitrarily determined, it is preferably advantageous to dispose the rigidity-reinforcing portion near the piezoelectric element 30 that is vibrated significantly. The electronic components forming the rigidity-reinforcing portion are not limited to the dynamic speaker 160 and the camera module 170, and any appropriate electronic components may be used. The rigidity-reinforcing portion may be configured to improve rigidity of the rear case 61 and the cover member 62 by providing a protruding elastic member configured to come into pressure contact with the cover member 62 and/or the rear case 61. In the first embodiment also, the rigidity-reinforcing portion configured by the elastic body may be disposed in the appropriate position between the rear case 61 and the cover member 62 so as to apply pressing force to the rear case 61 and the cover member 62 as in the second embodiment. The rear case 61 and the cover member 62 do not necessarily need to be of recessed shapes and may be of appropriate shapes.

When the panel 10 and the display unit 20 are not superposed, the piezoelectric element unit 30 may be disposed in a middle of the panel 10. When the piezoelectric element 30 is disposed in the middle of the panel 10, the vibration of the piezoelectric element 30 is evenly transmitted to the whole panel 10, thereby improving a quality of air-conduction sound and allowing the user to perceive vibration sound even when the user places the ear in contact with the panel 10 at different positions of the panel 10. Note that the piezoelectric element 30 may be provided in plurality.

Although in the above electronic device 1 the piezoelectric element 30 is adhered to the panel 10, the piezoelectric element 30 may be attached to another place than the panel 10. For example, in the first embodiment, the piezoelectric element 30 may be adhered to the cover member 62 that is configured to be attached to the housing 60 to cover the battery 150. Since the cover member 62 is often attached to a surface different from the panel 10 in the electronic device 1 such as the mobile phone, the above structure enables the user to listen to sound by placing a portion of the body (e.g. the ear) in contact with the surface different from the panel 10.

The panel 10 may form a part or an entirety of any one of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel includes the touch panel of the first embodiment. The operation panel may also include a sheet key, namely, a component of the foldable mobile phone or the like that is integrally provided with a key top as the operation key and that forms one surface of the housing on an operational side.

Meanwhile, in the first embodiment and the second embodiment, the joining member used for adhering the panel 10 and the piezoelectric element 30, the joining member used for adhering the panel 10 and the housing 60 (60a), and the like are denoted by the same reference numeral as the joining member 70. However, the joining members used in the first embodiment and the second embodiment may be different depending on the components to be joined, as appropriate.

REFERENCE SIGNS

1 electronic device
5 wireless communication unit
10 panel
20 display unit
30 piezoelectric element
40 input unit
41 mouthpiece
50 control unit
60, 60a, 60b housing
61 rear case (second housing portion)
61a recessed portion (second recessed portion)
62 cover member (first housing portion)
62a recessed portion (first recessed portion)
63, 64, 65, 66, 67 elastic body
70 joining member
80 reinforcing member
130 circuit substrate
150 battery
160 dynamic speaker
170 camera module

The invention claimed is:

1. An electronic device, comprising: a panel, a housing configured to hold the panel; and a piezoelectric element attached to the panel, wherein sound transmitted by bending the panel with the piezoelectric element such that a portion of the panel directly above the piezoelectric element protrudes relative to neighboring portions of the panel in a long side direction of the piezoelectric element and by vibrating a contacting part of a human body that is in contact with the bent panel, and wherein a rigidity-reinforcing portion is disposed in the housing, and wherein a vibration occurs in an area of the panel that is larger than an area having a length corresponding to a distance from an inferior crus of antihelix to an antitragus and a width corresponding to a distance from a tragus to an antihelix of an ear of the human body.

2. The electronic device of claim 1, wherein
the rigidity-reinforcing portion applies pressing force to the housing.

3. The electronic device of claim 1, wherein
the rigidity-reinforcing portion is configured using an electronic component and an elastic body.

4. The electronic device of claim 3, wherein
the electronic component comprises a battery.

5. The electronic device of claim 4, wherein
the elastic body serves as a wave absorber sheet that covers the battery.

6. The electronic device of claim 4, wherein
a sealing member attached to a surface of the battery serves as the elastic body.

7. The electronic device of claim 3, wherein
the electronic component comprises a speaker.

8. The electronic device of claim 7, wherein
the elastic body serves as a waterproof sheet that covers the speaker.

9. The electronic device of claim 3, wherein
the electronic device comprises a camera module.

10. The electronic device of claim 1, wherein
the housing includes a first housing portion including a first recessed portion and a second housing portion located inward of the first recessed portion, and the second housing portion and the rigidity-reinforcing portion are disposed in the first recessed portion.

11. The electronic device of claim 10, wherein
the second housing portion includes a second recessed portion, and the rigidity-reinforcing portion is disposed between a bottom portion of the first recessed portion and a bottom portion of the second recessed portion.

12. The electronic device of claim 11, wherein the panel is vibrated in the second recessed portion and in a range that remains out of contact with the bottom portion of the second recessed portion during the vibration.

13. The electronic device of claim 1, wherein the piezoelectric element is disposed on one end side of the housing in one direction thereof.

14. The electronic device of claim 1, wherein the vibration occurs in an area of the panel that is larger than an area having a length corresponding to a distance from a portion of a helix that is near a superior crus of antihelix (a superior crus anthelicis) to an auricular lobule and a width corresponding to a distance from the tragus to a portion of the helix that is near the antihelix.

15. The electronic device of claim 1, wherein the piezoelectric element is fixed such that the piezoelectric element is joined to the housing by a joining member.

16. The electronic device of claim 15, wherein the joining member comprises an adhesive agent that is not thermosetting.

17. The electronic device of claim 15, wherein the joining member comprises a double-sided adhesive tape.

18. The electronic device of claim 1, wherein the panel is joined to the housing by a joining member.

19. The electronic device of claim 18, wherein the joining member comprises an adhesive agent that is not thermosetting.

20. The electronic device of claim 18, wherein the joining member comprises a double-sided adhesive tape.

21. The electronic device of claim 1, wherein the panel forms a part or an entirety of any of a display unit, an input unit, and a cover of the display unit.

22. The electronic device of claim 21, wherein the panel forms a part or an entirety of any of the display unit and the cover of the display unit, and the piezoelectric element is disposed outside of a display area provided for a display function.

23. The electronic device of claim 21, wherein the display unit is fixed to the panel from an inside of the housing.

24. The electronic device of claim 1, wherein the piezoelectric element is attached to a surface of an inner side of the housing of the panel.

25. The electronic device of claim 1, wherein deformation is caused in any area of the panel for transmission of human body vibration sound.

26. The electronic device of claim 1, wherein the panel includes, in areas thereof that are vibrated, a plurality of portions that is configured to vibrate in a direction intersecting with a main surface of the panel, and in each of the plurality of portions, a value indicating amplitude of the vibration transitions over time from plus to minus or vice versa.

27. An electric device, comprising: a piezoelectric element; a vibration plate to which the piezoelectric element is joined for vibration; and a housing to which the vibration plate is joined, wherein sound is transmitted by bending the vibration plate with the piezoelectric element such that a portion of the vibration plate directly above the piezoelectric element protrudes relative to neighboring portions of the vibration plate in a long side direction of the piezoelectric element and by vibrating a pressed part of a human body that is pressed against the bent vibration plate, and wherein a rigidity reinforcing portion is disposed in the housing, and wherein a vibration occurs in an area of the panel that is larger than an area having a length corresponding to a distance from an inferior crus of antihelix to an antitragus and a width corresponding to a distance from a tragus to an antihelix of an ear of the human body.

28. The electronic device of claim 27, wherein, when pressed with force greater than or equal to 3 N, the pressed part is vibrated, and sound is transmitted.

29. The electronic device of claim 27, wherein, when pressed with force greater than or equal to 5 N, the pressed part is vibrated, and sound is transmitted.

30. The electronic device of claim 27, wherein, when pressed with force less than or equal to 10 N, the pressed part is vibrated, and sound is transmitted.

* * * * *